(12) United States Patent
Douglas et al.

(10) Patent No.: US 11,194,411 B1
(45) Date of Patent: Dec. 7, 2021

(54) USE OF SENSORS IN ELECTRONIC PENS TO EXECUTION FUNCTIONS

(71) Applicant: Lenovo (Singapore) Pte. Ltd., Singapore (SG)

(72) Inventors: David W. Douglas, Cary, NC (US); Adam Jerome Cavenaugh, Cary, NC (US); Kenneth Seethaler, Raleigh, NC (US); Koji Kawakita, Yokohama (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 16/998,727

(22) Filed: Aug. 20, 2020

(51) Int. Cl.

| | |
|---|---|
| *G06F 3/038* | (2013.01) |
| *G06F 3/041* | (2006.01) |
| *G06F 3/0354* | (2013.01) |
| *G06F 3/0488* | (2013.01) |
| *G06F 3/0346* | (2013.01) |
| *G06F 21/32* | (2013.01) |
| *G06F 9/4401* | (2018.01) |
| *G06F 3/0483* | (2013.01) |
| *G06K 9/00* | (2006.01) |
| *G06F 3/16* | (2006.01) |
| *G06F 3/0485* | (2013.01) |

(52) U.S. Cl.
CPC .......... *G06F 3/0383* (2013.01); *G06F 3/0346* (2013.01); *G06F 3/03545* (2013.01); *G06F 3/04162* (2019.05); *G06F 3/04883* (2013.01); *G06F 9/4418* (2013.01); *G06F 21/32* (2013.01); *G06F 3/0483* (2013.01); *G06F 3/0485* (2013.01); *G06F 3/165* (2013.01); *G06K 9/00194* (2013.01)

(58) Field of Classification Search
CPC .. G06F 3/0383; G06F 3/04162; G06F 3/0346; G06F 3/03545; G06F 3/04883; G06F 9/4418; G06F 21/32; G06F 3/0483; G06F 3/0485; G06F 3/165; G06K 9/00194
See application file for complete search history.

(56) References Cited

U.S. PATENT DOCUMENTS

| | | | |
|---|---|---|---|
| 2003/0006975 A1* | 1/2003 | Moriya | G06F 1/1632 345/179 |
| 2004/0228532 A1* | 11/2004 | Fernandez | G06F 3/0481 382/187 |
| 2005/0122209 A1* | 6/2005 | Black | G06Q 20/341 340/5.52 |
| 2006/0028457 A1* | 2/2006 | Burns | G06F 3/0421 345/179 |
| 2012/0116972 A1* | 5/2012 | Walker | G06Q 20/40 705/44 |
| 2013/0125068 A1* | 5/2013 | Harris | G06F 3/017 715/863 |

(Continued)

*Primary Examiner* — Dmitriy Bolotin
(74) *Attorney, Agent, or Firm* — John M. Rogitz; John L. Rogitz

(57) ABSTRACT

In one aspect, a device may include at least one processor and storage accessible to the at least one processor. The storage may include instructions executable by the at least one processor to receive, from a stylus, at least one transmission indicating movement of the stylus. The instructions may also be executable to take, based on the at least one transmission, at least one action at the device. The stylus itself may include one or more motion sensors to sense the movement.

20 Claims, 12 Drawing Sheets

(56) References Cited

U.S. PATENT DOCUMENTS

| | | | |
|---|---|---|---|
| 2013/0207937 A1* | 8/2013 | Lutian | G06F 3/042 345/175 |
| 2014/0028635 A1* | 1/2014 | Krah | G06F 3/041 345/179 |
| 2014/0035886 A1* | 2/2014 | Idzik | G06F 3/046 345/179 |
| 2014/0176495 A1* | 6/2014 | Vlasov | G06F 3/0441 345/174 |
| 2014/0218343 A1* | 8/2014 | Hicks | G06F 3/03545 345/179 |
| 2014/0253468 A1* | 9/2014 | Havilio | G06F 3/03545 345/173 |
| 2014/0306900 A1* | 10/2014 | Son | G06F 3/041 345/173 |
| 2015/0363012 A1* | 12/2015 | Sundara-Rajan | G06F 3/04162 345/179 |
| 2017/0255378 A1* | 9/2017 | Desai | G06F 3/04845 |
| 2017/0364167 A1* | 12/2017 | Ribeiro | G06F 3/0383 |
| 2018/0143756 A1* | 5/2018 | Mildrew | G06T 19/003 |
| 2018/0181199 A1* | 6/2018 | Harvey | G06F 3/011 |
| 2018/0329526 A1* | 11/2018 | Peretz | G06F 3/03545 |
| 2019/0042009 A1* | 2/2019 | Kumar | G06F 3/0346 |
| 2019/0369752 A1* | 12/2019 | Ikeda | G02B 27/017 |

\* cited by examiner

USE OF SENSORS IN ELECTRONIC PENS TO EXECUTION FUNCTIONS

FIELD

The present application relates to technically inventive, non-routine solutions that are necessarily rooted in computer technology and that produce concrete technical improvements.

BACKGROUND

As recognized herein, current electronic pens do not have many, if any, electronic components. Instead, they are commonly used as a tool for users to write on a touch-enabled surface as sensed by the touch-enabled surface itself. As also recognized herein, this limits the potential functionality of both the electronic pens and the other devices that interact with the pens, and fails to provide additional intuitive ways to use the pens to interact with the other devices. There are currently no adequate solutions to the foregoing computer-related, technological problem.

SUMMARY

Accordingly, in one aspect a device includes at least one processor and storage accessible to the at least one processor. The storage includes instructions executable by the at least one processor to receive, from a stylus, at least one transmission indicating movement of the stylus. The instructions are also executable to take, based on the at least one transmission, at least one action at the device.

Thus, in some example implementations the instructions may be executable to wake the device based on the at least one transmission, with the device being wakened from one or more of a sleep state and/or a hibernate state.

Also in some example implementations, the instructions may be executable to launch at least a first application at the device based on the at least one transmission. So, for example, the first application may be an application that uses input from the stylus to perform at least one function at the device, and the first application may be different from an operating system executable at the device.

Still further, in some example implementations the instructions may be executable to, responsive to the at least one transmission indicating movement of the stylus and then no movement of the stylus, one or more of close a first application that uses input from the stylus to execute a function and/or revert to a previously-presented display screen.

Additionally, in some example implementations the device may include a touch-enabled display accessible to the at least one processor, and the instructions may be executable to determine that a portion of the stylus is being twisted based on the at least one transmission. The instructions may then be executable to, based on the determination, change a color of ink in which handwriting or drawing input received at the device will be represented on the touch-enabled display.

Still further, in some examples the instructions may be executable to, based on the at least one transmission, one or more of scroll a page and/or perform a page up or page down action. Additionally or alternatively, the instructions may be executable to, based on the at least one transmission, play or pause presentation of media at the device. Also if desired, the instructions may be executable to, based on the at least one transmission, change a volume output level for the device up or down.

Further, in some example implementations the device may include a headset and the instructions may be executable to, based on the at least one transmission, present one or more images on a transparent display of the headset. The one or more images may represent the movement of the stylus as indicated by the at least one transmission.

Also in some example implementations, the instructions may be executable to, based on the at least one transmission, authenticate a user's signature.

In another aspect, a method includes receiving, at a device and from an electronic pen, at least one signal indicating movement of the electronic pen. The method also includes executing, based on the at least one signal, at least one function at the device.

So, for example, the method may include authenticating a user's signature based on the at least one signal by respectively comparing stroke speed and stroke pattern indicated via the at least one signal to a reference stroke speed and a reference stroke pattern. The reference stroke speed and reference stroke pattern may be established prior to receipt of the at least one signal.

As another example, the method may include launching at least a first application at the device responsive to the at least one signal, where the first application may be associated with processing input from the electronic pen.

As yet another example, the method may include determining, based on the at least one signal, that a portion of the electronic pen is being twisted. In this example the method may then include, based on the determination, changing from presenting ink on the display based on future input from the electronic pen to erasing already-presented ink based on future input from the electronic pen.

In still another aspect, an electronic pen includes an elongated body, a tip coupled to the body, and a motion sensor that senses motion of the electronic pen. The motion sensor is coupled to the body.

In some examples, the electronic pen may include a processor and storage accessible to the processor. Also in these examples, the motion sensor may include an accelerometer and/or a gyroscope. The storage itself may include instructions executable by the processor to transmit, to a device different from the electronic pen, input from one or more of the accelerometer and the gyroscope.

Still further, if desired the motion sensor may be disposed in a first hardware module that is detachable, by an end-user, from the body and replaceable with a second hardware module that includes another sensor different from the motion sensor.

The details of present principles, both as to their structure and operation, can best be understood in reference to the accompanying drawings, in which like reference numerals refer to like parts, and in which:

DETAILED DESCRIPTION

Figure 1:
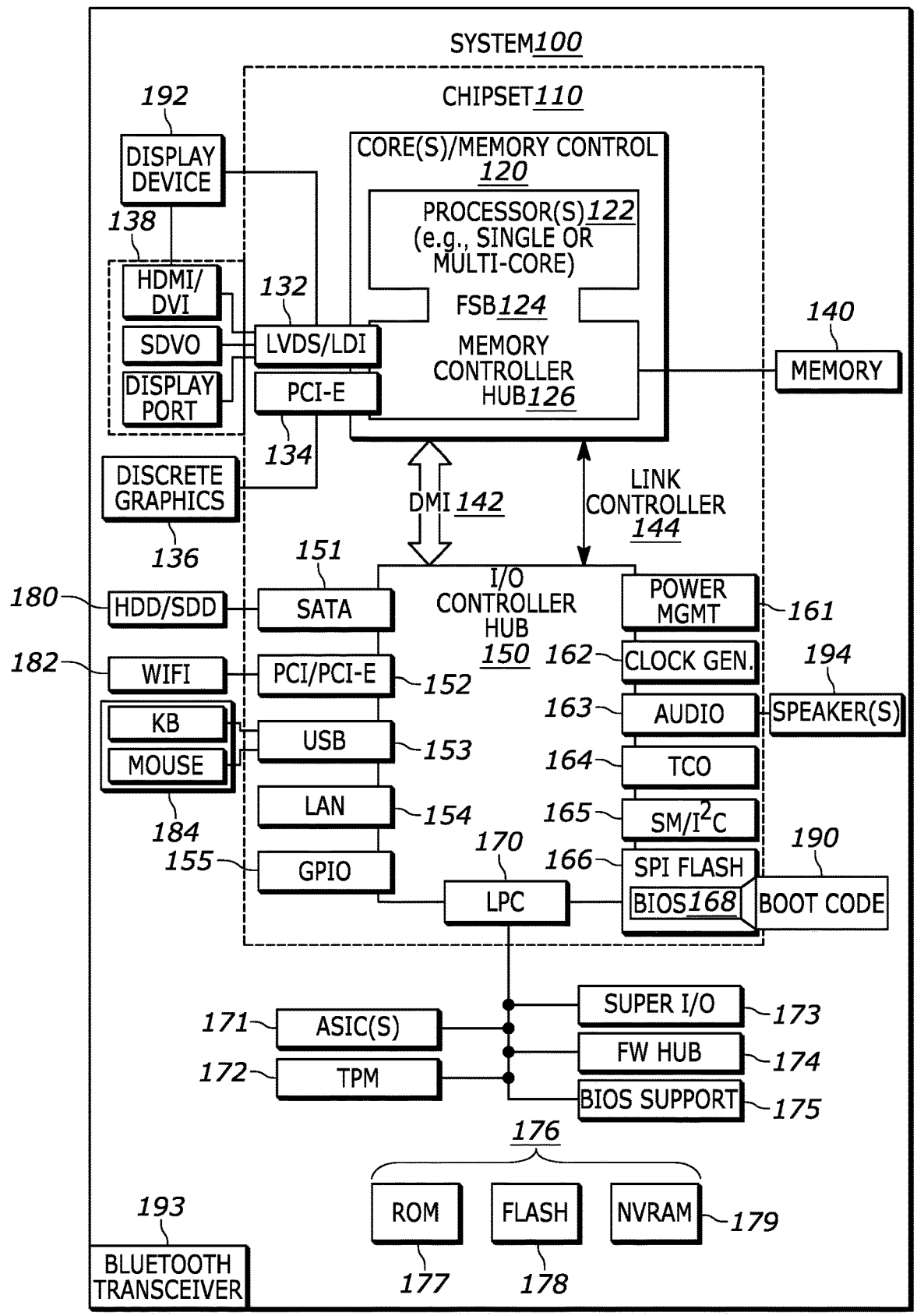
FIG. 1 is a block diagram of an example system consistent with present principles.

Note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to hypertext markup language (HTML)-5, Java®/JavaScript, C# or C++, and can be stored on or transmitted from a computer-readable storage medium such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, a Bluetooth network using Bluetooth 5.0 communication, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

Still further, the system 100 may include a Bluetooth transceiver and/or other short-range wireless communication transceiver 193 for use to communicate with a stylus or electronic pen consistent with present principles. For example, one or more publicly-available Bluetooth specifications may be used for Bluetooth communication with a stylus or pen using the transceiver 193. Thus, the Bluetooth communication transceiver 193 may be a classic Bluetooth transceiver and/or a Bluetooth low energy (BLE) transceiver (e.g., Bluetooth 5.0 transceiver) for communicating with other devices using Bluetooth communication protocols. Additionally, as alluded to above the transceiver 193 may also be configured for communication using other protocols as well and may therefore establish a Zigbee transceiver, Z-wave transceiver, near field communication (NFC) transceiver, infrared transceiver, a Wi-Fi direct transceiver, and/or wireless universal serial bus (USB) transceiver.

Additionally, though not shown for simplicity, in some embodiments the system 100 may include a gyroscope that senses and/or measures the orientation and/or movement of the system 100 and provides related input to the processor 122, as well as an accelerometer that senses acceleration and/or movement of the system 100 and provides related input to the processor 122. Still further, the system 100 may include an audio receiver/microphone that provides input from the microphone to the processor 122 based on audio that is detected, such as via a user providing audible input to the microphone. The system 100 may also include a camera that gathers one or more images and provides images and related input to the processor 122. The camera may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video. Also, the system 100 may include a global positioning system (GPS) transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
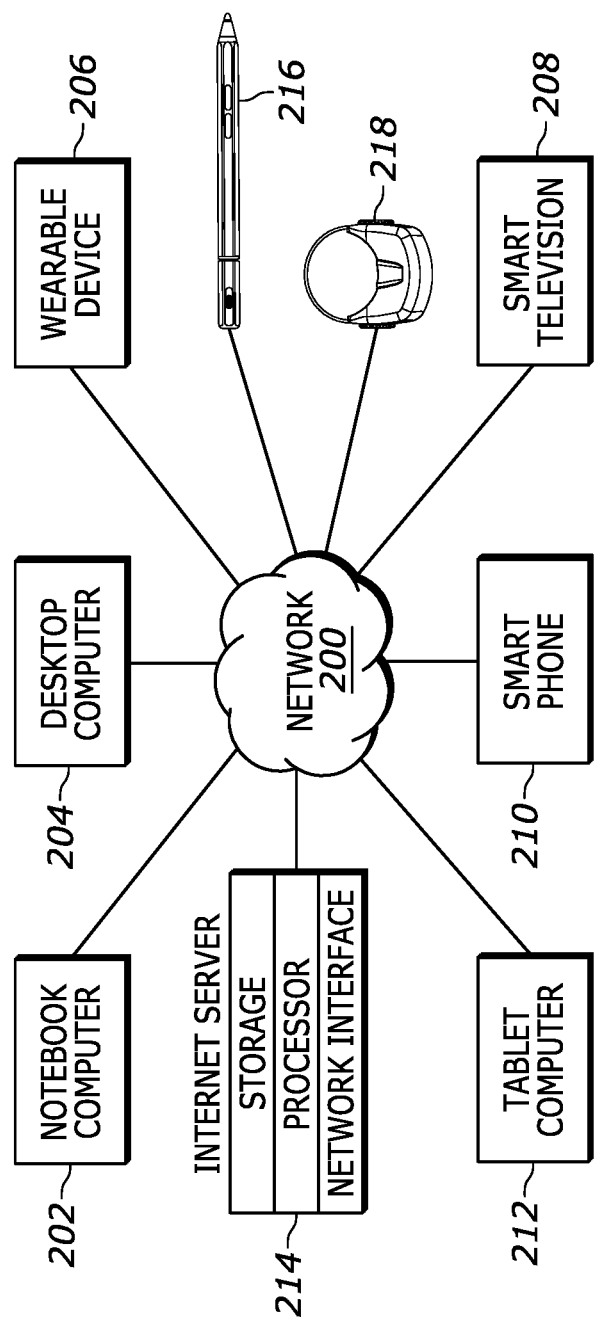
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a stylus or electronic pen 216, a headset 218, and a server 214 such as an Internet server that may provide cloud storage accessible to the devices 202-212, 216, 218. It is to be understood that the devices 202-218 may be configured to communicate with each other directly and/or over the network 200 to undertake present principles. For example, Wi-Fi direct or Bluetooth communication may be used.

Figure 3:
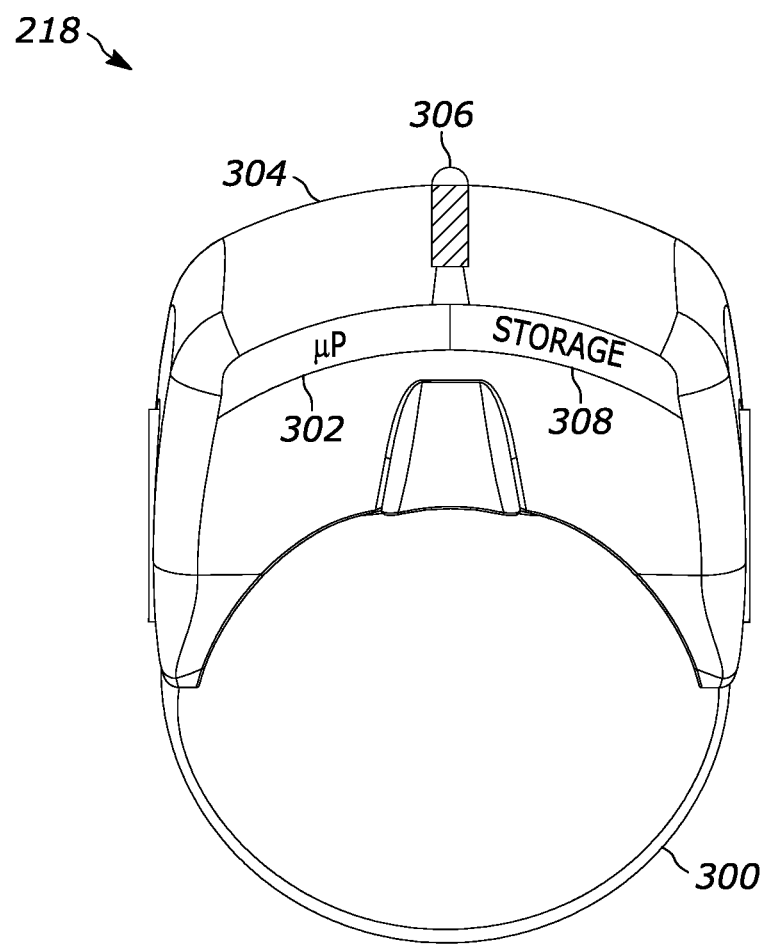
FIG. 3 is a block diagram of an example augmented reality (AR) headset consistent with present principles.

Now describing FIG. 3, it shows a top plan view of a headset, such as the headset 218, consistent with present principles. The headset 218 may include a housing 300, at least one processor 302 in the housing, and a transparent "heads up" display 306 accessible to the at least one processor and coupled to the housing. The display 306 may for example have discrete left and right eye pieces as shown for presentation of stereoscopic and/or augmented reality images/objects consistent with present principles.

The headset 218 may also include one or more forward-facing cameras 306. As shown, the camera 306 may be mounted on a bridge portion of the display 304 so that it may have an outward-facing field of view similar to that of a user wearing the headset 218. However, the camera(s) 306 may be located at other headset locations as well. The camera(s) 306 may be used for, among other things, computer vision, image registration, spatial mapping, and/or simultaneous localization and mapping (SLAM) for augmented reality (AR) processing and presentation of AR content consistent with present principles. Further note that in some examples that inward-facing cameras may also be mounted within the headset 218 and oriented to image the user's eyes for eye tracking while the user wears the headset 218.

Additionally, the headset 316 may include storage 308 accessible to the processor 302 and coupled to the housing 300, as well as still other components not shown for simplicity such as a network interface (e.g., Bluetooth transceiver) for communicating with other devices such as a stylus consistent with present principles. Also not shown for simplicity may be a battery for powering components of the headset 218 such as the camera(s) 306. Additionally, note that while the headset 218 is illustrated as a head-circumscribing augmented reality (AR) headset, it may also be established by computerized smart glasses or another type of headset.

For example, the headset may be established by a virtual reality (VR) headset that may not have a transparent display but may still be able to present virtual AR objects/content on its display as disclosed herein along with a real-world, real-time camera feed of an environment imaged by the front-facing camera(s) 306 to provide an AR experience to the user. This AR technique might similarly apply to other mobile devices with non-transparent displays, such as smart phones and tablet computers.

Figure 4:
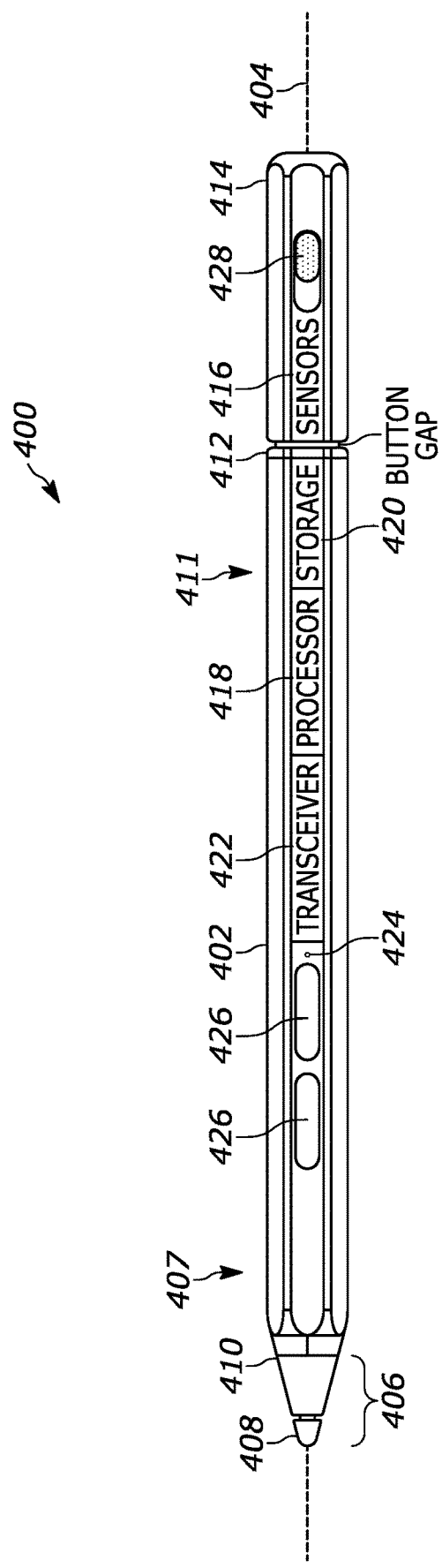
FIG. 4 is a block diagram of an example electronic pen or stylus consistent with present principles.

Now describing FIG. 4, it shows an example stylus or electronic pen 400. As shown, the pen 400 may include an elongated body or housing 402 establishing a longitudinal axis 404. The body 402 may be made of aluminum or another suitable material such as plastic. If aluminum, the exterior of the body 402 may be finished with sandblasting and anodizing. The body 402 may include a pen tip 406 located at one end segment 407 of the body 402 as shown, with the tip 406 being conical or frustoconical in shape.

In some examples, the tip 406 may include two portions 408, 410. The portions 408 and 410 may both be made of plastic or rubber, for example, with the portion 408 having a matt finish and the portion 410 having a texture finish for gripping by an end-user in certain implementations.

At an opposite end segment 411 of the body as also shown may be a ring 412 that may be made of stainless steel (or another suitable material) and may have a physical vapor deposition (PVD) finish in some examples. Additionally, the end segment 411 may include a coupling element or connector inside the body 402 to connect to a detachable hardware module 414 that may act as an extension of the end segment 411 when coupled thereto via the connector. The connector inside the body 402 may be a female connector for connecting to a male connector on the module 414 or vice versa. Other suitable types of connectors may also be used, such as reciprocal micro universal serial bus (USB) connectors. But regardless, it is to be understood that the connector on the module 414 and on the pen body 402, when connected, provide an electrical and data connection between electronic components in the module 414 and electronic components in the body 402.

For example, one or more motion sensors 416 may be disposed in the module 414, such as one or more accelerometers (e.g., 3-axis accelerometers), one or more gravity sensors, one or more magnetometers, and one or more gyroscopes (e.g., 3-axis gyroscopes). The motion sensors 416 may therefore provide a six degree of freedom inertial measurement unit and report things such as pen orientation, velocity, acceleration, angular rotation rate, and gravitational force to a processor 418 in the body 402 via the connection between the body 402 and module 414 (though the processor 418 may also be located in the module 414 in certain examples).

Other electrical components that may be included in the body 402 (and/or module 414) include non-transitory storage 420 and one or more wireless transceivers such as a Wi-Fi transceiver and a Bluetooth transceiver 422, both of which may be controlled by the processor 418. Additionally, note that the processor 418 may control the transceiver 422 to transmit data indicating motion of the pen 400 as received from the motion sensors 416 to another device in communication with the pen 400 (e.g., Bluetooth communication), such as a tablet computer, augmented reality headset, or laptop computer.

A light-emitting diode (LED) 424 may also be coupled to the body 402 to project light outward away from the pen body 402 under control of the processor 418. The LED 424 may be white or color-changing between, e.g., red, blue, and green. The exterior of the LED 424, which may be flush with surrounding portions of the surface of the body 402, may be made of plastic or another suitable material. The processor 418 may control the LED 424 to output light at various times to indicate various pieces of information to an end-user, and different colors may likewise be used to indicate various pieces of information (e.g., green to indicate that the pen 400 is turned on, blue to indicate motion is sensed by the sensors 416, etc.).

Still further, as also shown the pen body 402 may include one or more buttons 426 lying flush with surrounding portions of the surface of the body 402. The buttons may be made of stainless steel or another suitable material and their exteriors may have a PVD finish in some examples. The buttons 426 may each correspond to a different command that the pen 400 may transmit to the other device with which it is communicating. For example, one or both buttons 426 may establish hotkeys for performing various functions, such as automatically launching respective applications at the other device that may each use input from the pen as directed to and/or sensed by a touch-enabled display of the other device. For example, one of the hotkeys may be depressed or touched (if touch-sensitive) to launch a note taking application at the other device while another one of the hotkeys may be depressed or touched to launch a drawing application at the other device.

Further describing the module 414, note that it may be made of plastic or another suitable material, and may have a painted finish in some examples. It may also bear an icon or other symbol as etched into the exterior of the module 414 using a laser. The icon may indicate the type of sensors inside the module 414, such as indicating an image and/or the word "motion" to indicate that the module 414 has motion sensors inside.

As indicated above, the module 414 may be connected to the body 402 via one or more connectors. As such, in some examples the module 414 may be detachable from the body 402 based on an interference fit or screw/thread combination as used for the connectors that connect the two components. The module 414 may thus be detachable, by an end-user, from the body 402 and replaceable with a second, different hardware module that may include another type of sensor(s) different from the motion sensors 416. Other types of sensors that might be included in the other hardware module (s) may include, for example, silicon photodiode light sensors and cameras, microphones, biometric sensors, and location sensors such as a GPS transceiver.

In some examples, one or more of the detachable modules (such as the module 414) may include a button 428 similar in configuration to the buttons 426 for providing a command to the other device in communication with the pen 400, where the command may vary based on whichever module the button 428 is disposed on. The button 428 may therefore be depressed or touched to provide a command to the other device that is different from the commands that may be provided based on selection of one of the buttons 426. The button 428 may be made of stainless steel or another suitable material and may have a PVD finish.

Though not shown for simplicity, note that the pen 400 may include other components as well. For example, a battery for powering other electrical components may be included on the pen 400 (in the body 402 and/or the module 414).

Additionally, the body 402 may be wrapped in a force or pressure-sensing film such as one manufactured by Peratech or Sensel. The pressure-sensing film may be in communication with the processor 418 in order to report areas of the exterior of the pen 400 gripped by a user, thus reporting grip and engagement of the pen 400 by the user. The processor 418 may in turn report the identification of user touch or engagement to the other device in communication with the pen 400 to execute a function such as one of those disclosed below. In certain examples, the processor 418 may even report particular areas of the pen 400 that are touched or gripped as well as the applied pressure at each point.

For example, the other device may launch an application responsive to identification of the pen 400 as being gripped and/or the user starting to write with the pen 400. As another example, the device may close a certain pen input window and return to a previously-presented display screen (or to a home screen) responsive to identification of the pen 400 as no longer being gripped and/or moving (as reported by the pen).

Also in some implementations, the end-user's grip as reported by the film may be used to identify and/or authenticate the user based on the user's unique grip location(s) and grip pressure(s) (e.g., to provide another level of authentication beyond authenticating based on pen stroke speed and pattern as will be described further below). As part of that authentication process, left handed grip, right handed grip, and/or finger grip configurations may be reported by the film.

Still further, in some implementations the amount of grip pressure applied to the film by one of more of the user's fingers may be correlated to an amount of bolding of electronic ink that is or will be presented on the display of the other device to represent handwriting or drawing provided using the pen. So, for example, more pressure to grip the pen may translate into greater bolding for ink presented on the other device's display, while less pressure may translate into less bolding for the ink.

Figure 5:
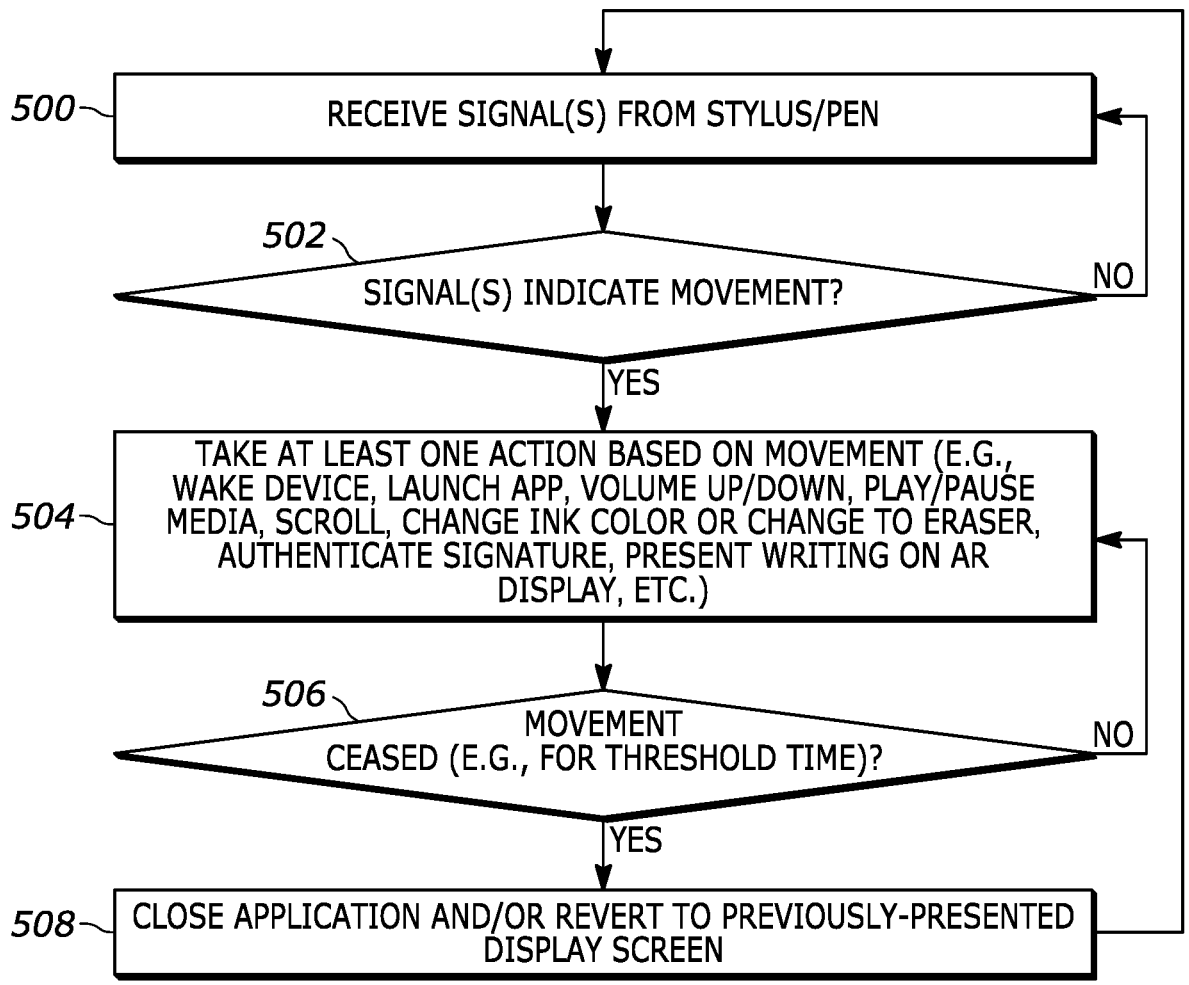
FIG. 5 is a flow chart of an example algorithm that may be executed by a device in communication with an electronic pen consistent with present principles.

Referring now to FIG. 5, it shows example logic consistent with present principles that may be executed by a device in communication with a stylus or pen, such as the system 100, a laptop computer, tablet computer, smart phone, wearable smart watch, augmented reality headset, etc. Beginning at block 500, the device may receive one or more wireless signal transmissions from the stylus or pen as transmitted from the pen using, e.g., Bluetooth communication. The transmitted signals as provided by the pen may indicate data sensed by one or more sensors in the pen, such as indicating motion or non-motion of the pen as sensed by a motion sensor in the pen.

The logic may then proceed to decision diamond 502 where the device may determine, based on the transmissions, whether they indicate movement of the pen. A negative determination may cause the logic to revert back to block 500 and proceed therefrom. However, an affirmative determination may instead cause the logic to proceed to block 504.

At block 504 the device may take at least one action based on the detected movement of the pen. For example, the device may be awoken from a sleep or hibernate state based on the movement (e.g., using wake-on-Bluetooth). As another example, an application associated with processing input from the pen may be initiated or launched responsive to an affirmative determination at diamond 502. The launched application may execute one or more functions based on commands received wirelessly from the pen (e.g., based on selection of one of the buttons 426 described above) and/or based on input received from the pen based on the pen contacting a touch-sensitive surface of the device (e.g., its touch-sensitive display) to provide handwriting or drawing input to the device. The launched application itself may be different from a native or guest operating system that may also be operating at the device.

Other functions that may be executed at the device based on the affirmative determination at diamond 502 may include turning a volume level for audio output from the device up or down, playing or pausing media playback such as a video or song, scrolling a page presented on the device's display, changing a color of ink to be presented on the display based on input from the pen, changing from ink input to eraser input to erase other ink already presented in the display, and authenticating a user's signature. As but one more example, the function may include representing handwriting on the display of the device (e.g., a transparent display if the device is an AR headset) as the handwriting was written in free space using the pen. The above examples will be described in more detail in FIGS. 7-17 below.

However, still in reference to FIG. 5, note that after block 504 the logic may proceed to decision diamond 506. At diamond 506 the device may receive additional signal transmissions from the pen and determine, based on those signals, whether movement of the pen has ceased for a threshold non-zero amount of time. The threshold amount of time may be five seconds, for example, as configured by the end-user or a system developer. Additionally or alternatively, at diamond 506 the device may determine whether the pen has been placed into its pen dock or bay within a housing of the device. A negative determination at diamond 506 may cause the logic to revert back to block 504, where the device may continue executing one or more functions in conformance with additional signals indicating additional motion of the pen. However, an affirmative determination at diamond 506 may instead cause the logic to proceed to block 508.

At block 508 the device may close or shutdown an application launched at block 504 responsive to the affirmative determination at diamond 502. Additionally or alternatively, at block 508 the device may revert to a previously-presented display screen such as a previously-presented window as previously presented prior to the action taken at block 504 (or revert to the device's home screen). So, for example, at block 504 the device may remove a first window of a first application as presented on the device's display and launch another application to present a different window for presenting handwriting as provided using the pen, and then at block 508 the device may close the other application and revert back to the previously-presented first window of the first application (which may not be configured for processing or presenting input from the pen).

Concluding the description of FIG. 5, note that from block 508 the logic may then revert back to block 500. The logic may then proceed from block 500 again based on additional signals from the pen.

Figure 6:
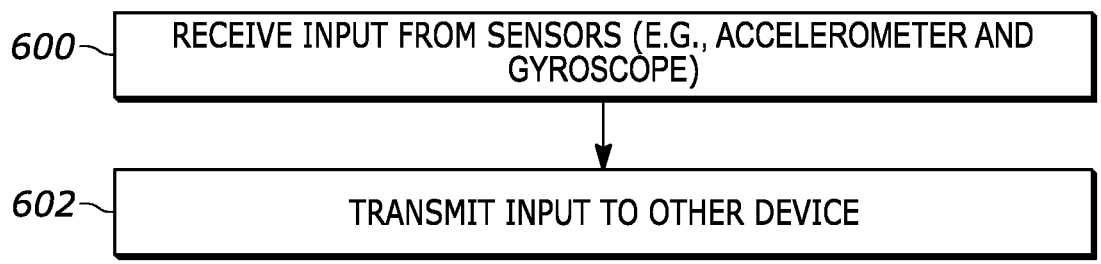
FIG. 6 is a flow chart of an example algorithm that may be executed by an electronic pen consistent with present principles.

Now describing FIG. 6, it shows example logic consistent with present principles that may be executed a pen or stylus, such as the pen 400 described above. Beginning at block 600, the processor of the pen may receive input from one or more sensors in the pen, such as input from one or more accelerometers and gyroscopes indicating motion of the pen as moved by an end-user. From block 600 the logic may then proceed to block 602.

At block 602 the pen may relay the input from the motion sensor(s) to another device in communication with it, such as a device that executes the logic of FIG. 5. Additionally, note that in some examples at block 602 the pen may encode or translate certain data from the sensor(s) prior to providing signals indicating the encoded or translated data to the other device.

In addition to or in lieu of the foregoing but also at block 602, the pen may control the other device via commands provided through Bluetooth communication based on the sensor input. The pen may control the other device to command the other device to execute certain functions as described herein, for example.

Now in reference to FIGS. 7-18, various examples are illustrated of functions a device such as a laptop computer or smart phone might execute based on signals from a pen indicating motion of the pen. The signals may have been transmitted to the device based on input from a motion sensor on the pen as described above, and the particular action or function the device might execute may depend on various device contexts such as which applications for processing pen input might already be executing at the device when signals from the pen indicating motion are received.

Figure 7:
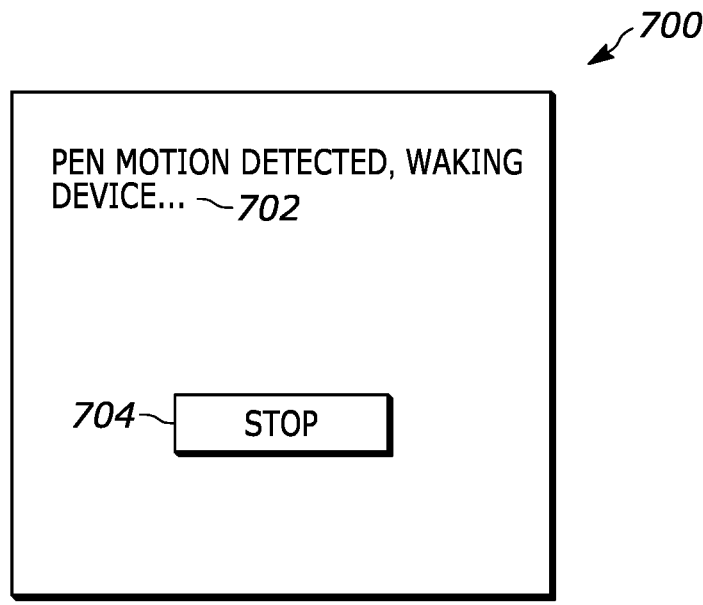
FIGS. 7-18 show various example graphical user interfaces (GUIs) and illustrations for various functions and actions a device might execute responsive to signals from an electronic pen indicating motion or non-motion of the pen.

Beginning first with FIG. 7, in a first example and responsive to any motion of the pen, the device may automatically and without additional user input (beyond moving the pen) wake up from a sleep or hibernate state and then, while waking up or responsive to waking up, present a graphical user interface (GUI) 700 on the device's electronic display. As shown in FIG. 7, the GUI 700 may include a prompt 702 with text indicating that pen motion has been detected and that the device is waking from a sleep or hibernate state. The GUI 700 may also include a selector 704 that may be selectable via touch or cursor input to command the device to stop waking up and go back into sleep or hibernate state.

Figure 8:
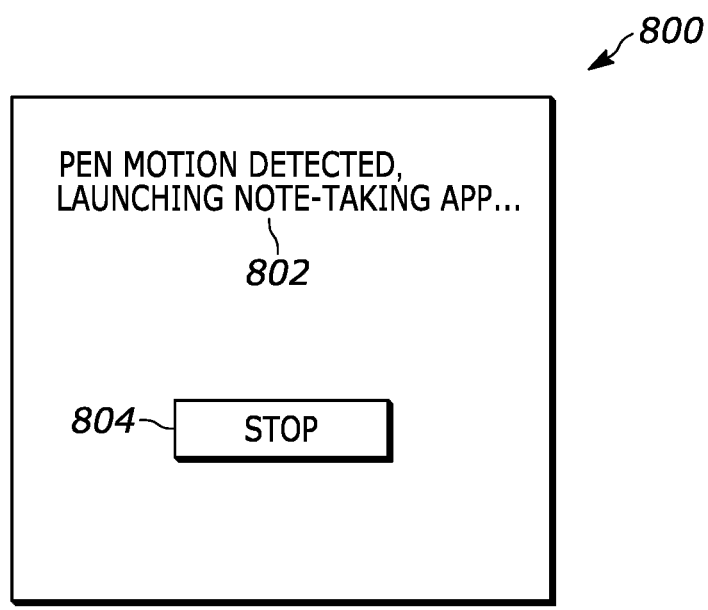

Now describing FIG. 8, in another example and responsive to any motion of the pen, the device automatically and without additional user input (beyond moving the pen) may launch a predetermined application for processing input from the pen and also present a GUI 800 on the device's display. The application may have been predetermined by the user or a developer for launching responsive to movement of the pen. Regarding the GUI 800, it may include a prompt 802 including text indicating that pen motion has been detected and that the predetermined application (a note taking application in this case) is being launched. The GUI 800 may also include a selector 804 that may be selectable via touch or cursor input to command the device to stop launching the application and/or to close the application if launched already.

Figure 9:
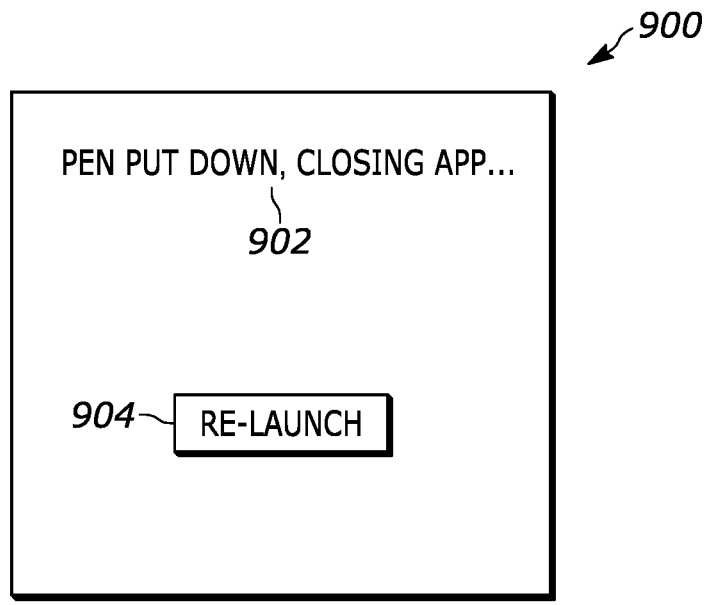

Moving on to FIG. 9, responsive to one or more signals from the pen that indicate that the pen is no longer moving or is not currently moving, the device may close an application that has been executing to process input from the pen and also present a GUI 900 on the device's display. For example, the application that is closed may be the same application that was launched according to FIG. 8. In any case, the GUI 900 may include a prompt 902 including text indicating that pen motion is no longer being detected and that the predetermined application is being closed. In closing the application, the device may also auto-save any document or data that was generated based on motion of the pen, and the text may further indicate as much (though not shown in FIG. 9 for simplicity). The GUI 900 may also include a selector 904 that may be selectable via touch or cursor input to command the device to stop closing the application and/or re-launch the application if closed already.

Figure 10:
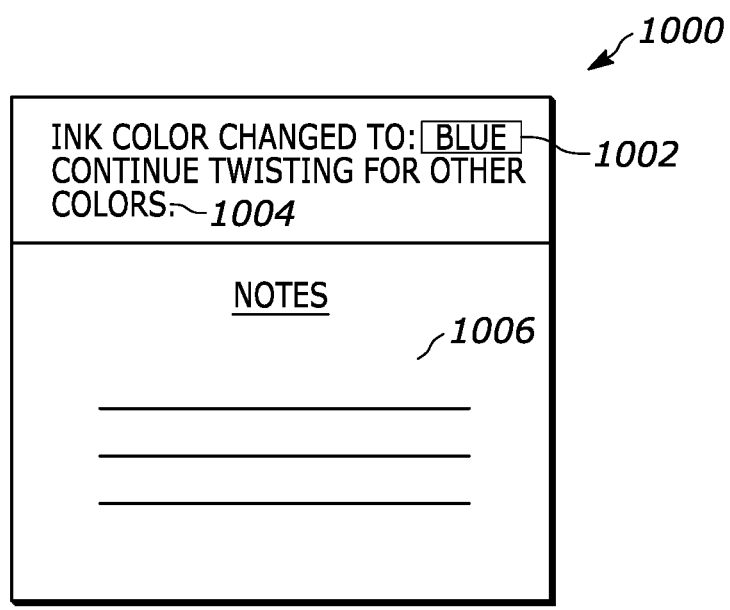

Continuing the detailed description in reference to FIG. 10, responsive to the device receiving one or more signals from the pen indicating angular velocity of the pen as generated via a twisting motion of the pen against the display of the device and/or about the pen's longitudinal axis (even if twisted in the air rather than against the display), the device may begin scrolling through potential ink colors for the color of ink that will be presented on the device's display to represent handwriting or drawing performed by the user using the pen. Also responsive to the signals indicating the angular velocity, the device may present the GUI 1000 shown in FIG. 10. The GUI 1000 may include a box 1002 at which a currently scrolled-to ink color is indicated and may further include a prompt 1004 that the user can continue twisting the pen to scroll to other colors to use for pen ink, which would then be reflected in the box 1002 as the user scrolls. Section 1006 illustrates example handwriting or drawing input provided to the device via the pen that may be changed or presented in a selected ink color.

Figure 11:
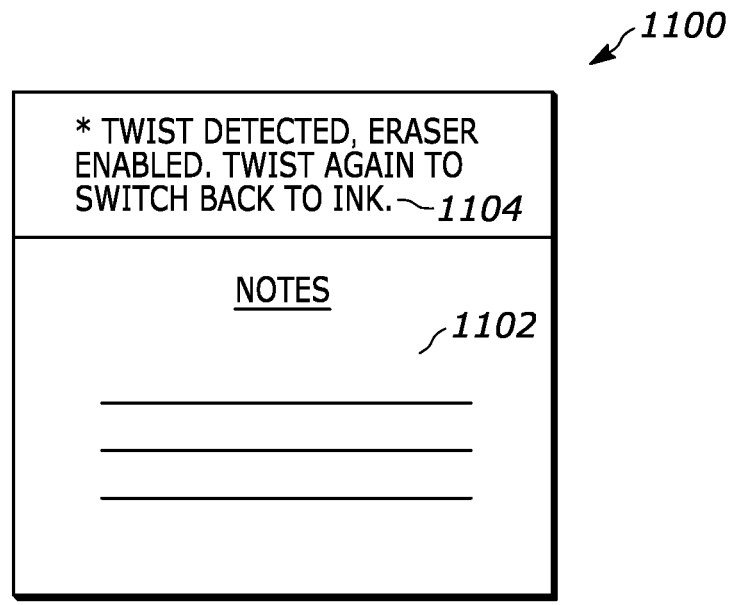

Contrasting FIG. 10 with FIG. 11, in other examples the pen may be twisted according to the paragraph above not to scroll through various ink colors but to switch between using the pen to write or draw to using the pen to erase already-presented ink, such as any of the example ink 1102 presented on the display. The GUI 1100 may also include a prompt 1104 indicating that pen twisting has been detected and that a pen eraser function has been enabled as a result. The prompt 1104 may also indicate that the user can twist the pen again (e.g., by a preset amount) to switch back from the eraser function to the inking function.

Still further, note that in addition to or in lieu of pen twisting to enable the pen eraser function, the pen may also be inverted or turned upside down. Responsive to the pen reporting as much (as sensed by the pen's motion sensors), the device may then enable the pen eraser function.

Figure 12:
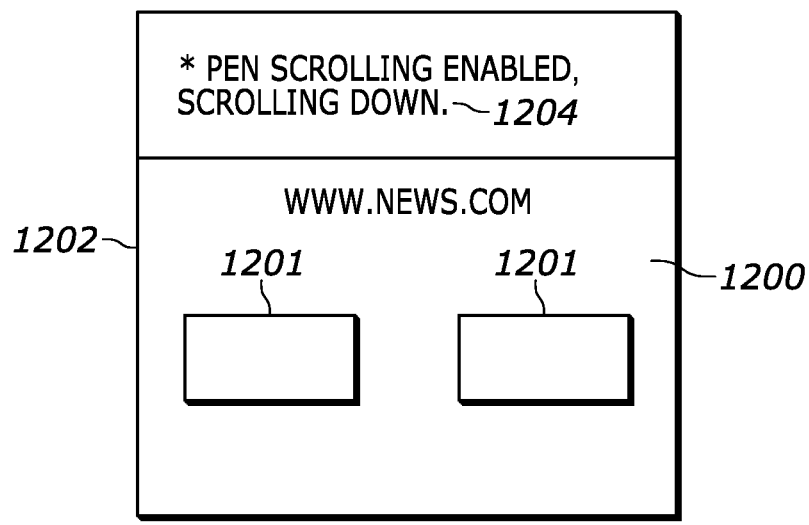

Now in reference to FIG. 12, in yet another example a user might be viewing a word processing document, web page, or other user interface that can be scrolled through, up and down as well possibly as left and right. According to this implementation, the user may gesture the tip of the pen up (e.g., in a plane orthogonal to the longitudinal axis of the pen) from its current position either in free space (e.g., the air) or against the device's display to provide a command to scroll up. Likewise, the user may gesture the tip of the pen down, left, or right to respectively provide down, left, or right scroll commands. Alternatively, the user may use the same gestures to provide page up, down, left and right commands even if the device does not scroll per se.

An example page 1200 with various links 1201 that may be scrolled is shown on the GUI 1202 of FIG. 12. Additionally, responsive to the device receiving signals from the pen indicating one of the gestures in the paragraph immediately above, the device may present the prompt 1204 indicating that pen scrolling is currently enabled and that the device is scrolling down on the page 1200 according to a detected scroll down command provided using the pen.

Figure 13:
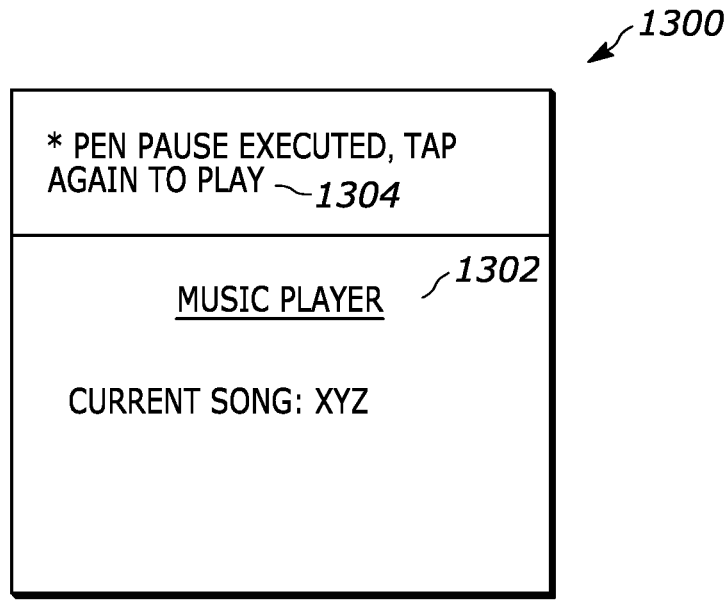
Figure 14:
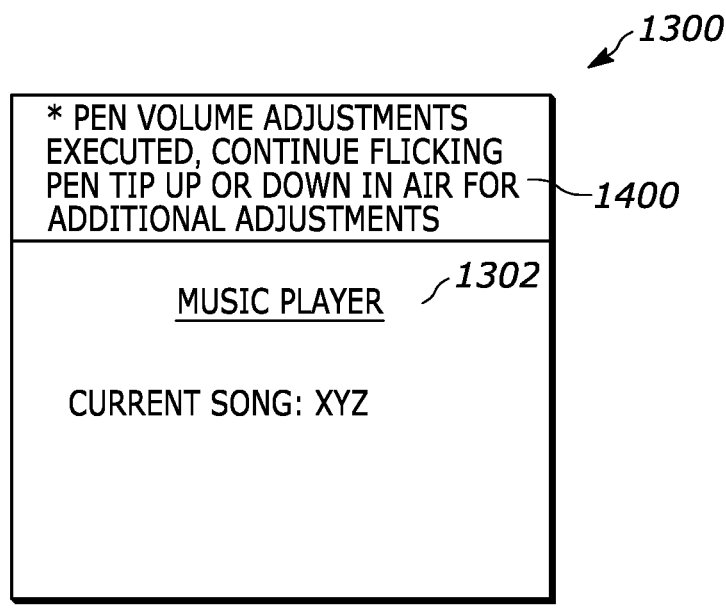

FIGS. 13 and 14 illustrate additional implementations consistent with present principles, this time to control various aspects of playback of a media file or other media content, such as audio-only content (e.g., a song or podcast), video-only content, or audio video content. According to the example shown in FIG. 13, the user may control the pen to perform an air tap where the jabs at the air with the pen tip along the longitudinal axis of the pen, or performs a similar tap of the pen tip but physically against the device's display or another surface. Responsive to the device receiving one or more signals from the pen indicating the tap, the device may pause media content that is currently being played or, if the media content is already paused, begin playing the media content again from the point at which it was paused. While doing so, the device may present the GUI 1300 that indicates various information 1302 about the media being presented. Further, responsive to detecting the tap, the device may dynamically present a prompt 1304 indicating that a media playback pause is being executed (or that the media is being played again after a pause) based on the pen motion. The prompt 1304 may also indicate that the user may perform the same action again to command the device to begin playing the media again (or to pause the media if already playing).

FIG. 14 illustrates that in addition to or in lieu of pen taps to play/pause media playback, the user may gesture or flick the pen tip up and down similar to the scrolling example above but this time to provide input to change a volume output level for media playback up or down (based on a respective flick up or down, e.g., in the air). Responsive to detecting the flicking up or down, the device may dynamically present a prompt 1400 indicating that a volume level for playback of the media is being changed and that the user may continue to perform flicking motions with the tip of the pen (against the device's display, another surface, or in the air) to further adjust the volume output level up or down.

Figure 15:
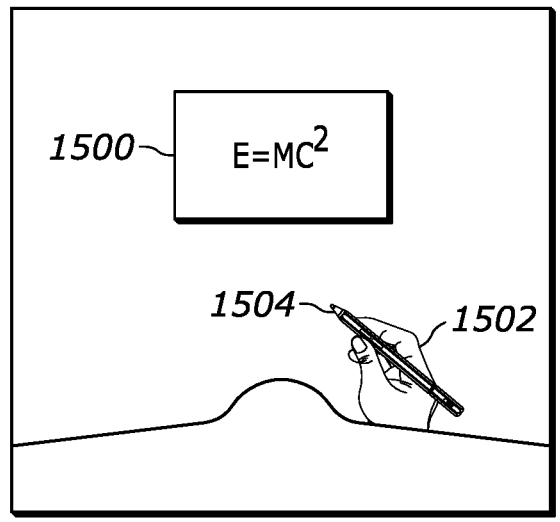

Now describing FIG. 15, suppose the device in communication with the pen is an augmented reality (AR) headset such as the headset described above in reference to FIG. 3. FIG. 15 shows the perspective of the user while looking out of the headset's display and into the real world to view a real-world, tangible white board 1500 mounted on a real-world wall of a room in which the user is located. The user's current perspective also allows the user to see his or her own hand 1502 as well as the pen 1504 being held by the hand 1502. The user may move the pen 1504 in the air while distanced from the white board (so that the pen does not physically contact the white board 1500 in the real world) in order to write or draw in the air. The pen 1504 may report the writing or drawing motions to the headset as sensed using the pen's motion sensor(s), and the headset may then use the reported motions to present tracings or images of the motions on its transparent display using an augmented reality algorithm to make the tracings or images appear as though physically written on the white board 1500 itself. In this case, the user has air-written Einstein's famous equation $E=mc^2$.

Figure 16:
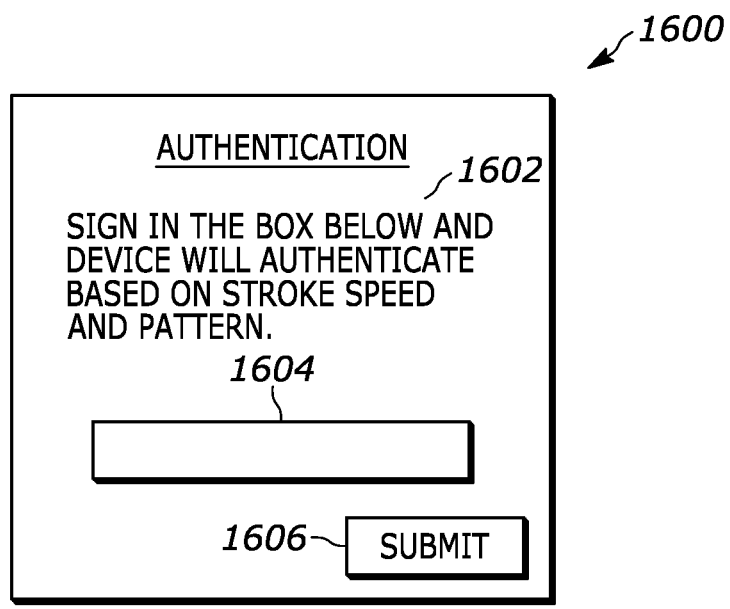

FIG. 16 shows yet another example consistent with present principles. It is to be understood in reference to this example that pen stroke speed/cadence and pen stroke pattern, as indicated via input from a motion sensor(s) in the pen, can be used to authenticate the signature of the user (or refuse authentication if another person attempts to copy the user's signature but with a different stroke speed and/or pattern). So, for example, the user's device may respectively compare stroke speed and stroke pattern as indicated via signals from the motion sensor(s) in the pen as the user writes on the GUI 1600 to a reference stroke speed and reference stroke pattern as previously reported by the pen's motion sensors while the user provided a reference signature during an authentication setup process. If the stroke speed and pattern match the reference speed and pattern to within a threshold level of tolerance, the user may be authenticated.

Accordingly, the GUI 1600 may be presented on the touch-enabled display of a device such as a smart phone or tablet computer. The GUI 1600 may include a prompt 1602 requesting that the user provide his or her signature in the box 1604 using an electronic pen (by pressing the pen tip against the device's display) so that the device can authenticate the user based on the user's stroke speed and pattern. However, also note that the user may provide the signature not to GUI 1600 but by writing on an inanimate surface apart from the device, such as a table top or desk, and the pen may still report stroke speed and pattern for authentication. The user may also write his or her signature in the air without having the pen contact any surface.

But regardless of whether the signature is provided within the box 1604 or to another surface or the air, the user may then select the submit button 1606 using touch or cursor input once the user has finished providing his or her signature. In response to selection of the button 1606, the device may then authenticate the user's signature based on stroke speed and pattern as reported from the motion sensor(s) in the pen.

Note that this form of authentication may be used by itself to authenticate the user, or may be used as part of multi-factor authentication where the user may be asked to authenticate via signature as described above as well as to authenticate via another method such as providing a username and password or entering a 6-digit code texted to the user. Signature authentication may also be combined with authentication based on pen grip as described above in reference to FIG. 4 and the pressure sensing film.

In any case, signature authentication alone or in combination with another form of authentication may be used to, for example, access an email account, access an online shopping portal, login to a website, login to a social networking service, etc. As another example, device login may be accomplished by the user picking up the pen to in turn cause the device to wake from a sleep or hibernate state, and then the user may attempt to login to the device to use it by writing the user's signature on any surface with the pen.

Figure 17:
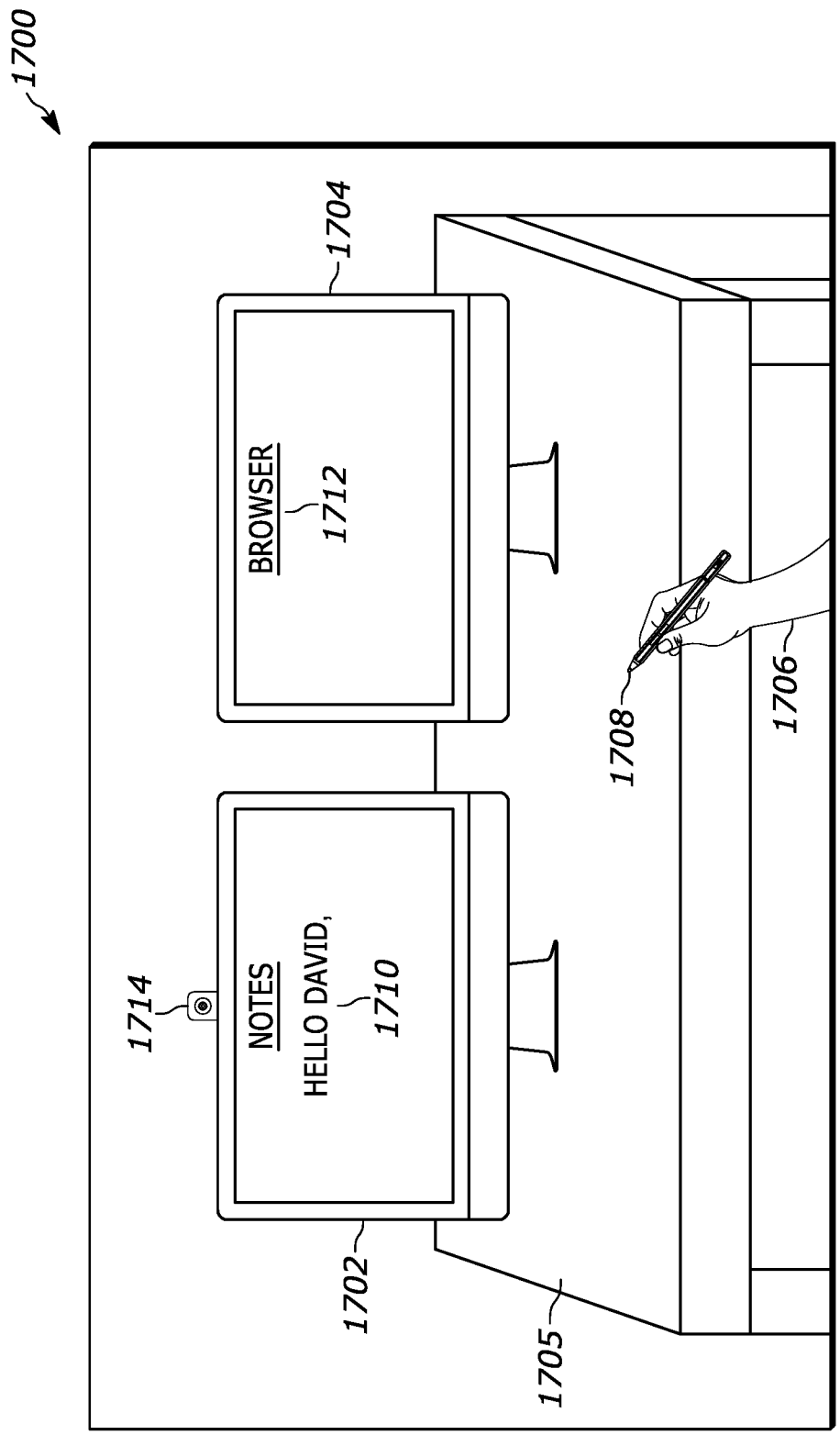

Continuing the detailed description in reference to FIG. 17, it shows an illustration 1700 of two desktop monitors or displays 1702 and 1704 that a user might have connected to a desktop computer at his or her office. The user may use the displays 1702, 1704 to present different information at the same time while working on a project, such as presenting a GUI 1710 on the display 1702 for presenting notes handwritten by the user separately against a non-electronic table top or desk top 1705 on which the displays 1702, 1704 are sitting using an electronic pen. As also shown, the display 1704 may present an internet browser GUI 1712 for navigating the Internet.

Consistent with present principles, the device that controls both of the displays 1702, 1704 may be dual-screen aware in that the device may present handwriting or drawing ink on the intended one of the displays 1702, 1704. To do so, a camera 1714 on one of the displays or located elsewhere in the environment may image the user's eyes for the device to determine, using eye tracking software, which screen the user is looking at while handwriting with a pen 1708 having one or more motion sensors inside (as held by the user's hand 1706). Additionally or alternatively, the user may point at one of the displays 1702, 1704 using the tip of the pen 1708 (e.g., point in the air without contacting any surface), which may be reported by the pen 1708 itself to the device based on input from one or more motion sensors in the pen. In either case, the device may then receive additional signals from the pen 1706 indicating additional motion of the pen 1706 as sensed by the motion sensor(s) in the pen and use the signals to reproduce, on the display identified as being looked at or gestured toward, the pen strokes on the identified display.

Additionally or alternatively, if only one of the GUIs or associated applications being presented on one of the displays 1702, 1704 is configured for reproducing handwriting or drawing input provided using the pen 1708, then gaze or pen gestures toward one of the displays need not necessarily be used and instead the device may simply process and present the handwriting ink on the particular display that is already presenting whatever application is configured for processing pen input. This may be done regardless of whether the user is writing in the air, against the surface 1705, etc.

As yet another variation, the user may write or draw (e.g., on the surface 1705) while looking at a display on which no GUI for presenting handwriting input is presented, and in response to identifying as much based on eye tracking the device may then move a GUI that can present handwriting input to the display being looked at. So, for example, if the user were looking at the display 1704 while handwriting using the pen 1708, the device may move the GUI 1710 from the display 1702 and present it on the display 1704 instead (while also presenting the representation of the user's handwriting on the GUI 1710 as moved to the display 1704).

Figure 18:
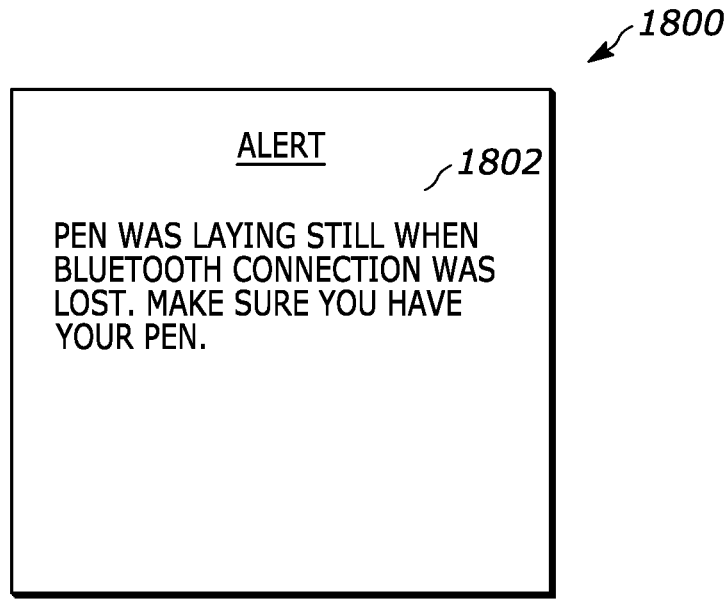

Now describing FIG. 18, another example is shown. In FIG. 18, a GUI 1800 is presented on the display of a user's device, such as a smart phone or laptop computer. In this example, assume the device and a user's electronic pen each have Bluetooth transceivers for communicating with each other. If the pen were determined to be lying still (as reported by motion sensors in the pen) when the Bluetooth connection between the two devices is lost, and/or if there is a devoted bay within the device in which the pen may be stored but the pen is not sensed as being in the bay, the device may determine based on this that the pen may have been forgotten or lost. Accordingly, the GUI 1800 may include a prompt 1802 indicating to the user that the pen was laying still when the Bluetooth connection was lost and indicating that the user should make sure he or she still has the pen with him or her. In some examples, the prompt 1802 may be accompanied by a haptic vibration or audible chime to further notify the user, if desired.

Figure 19:
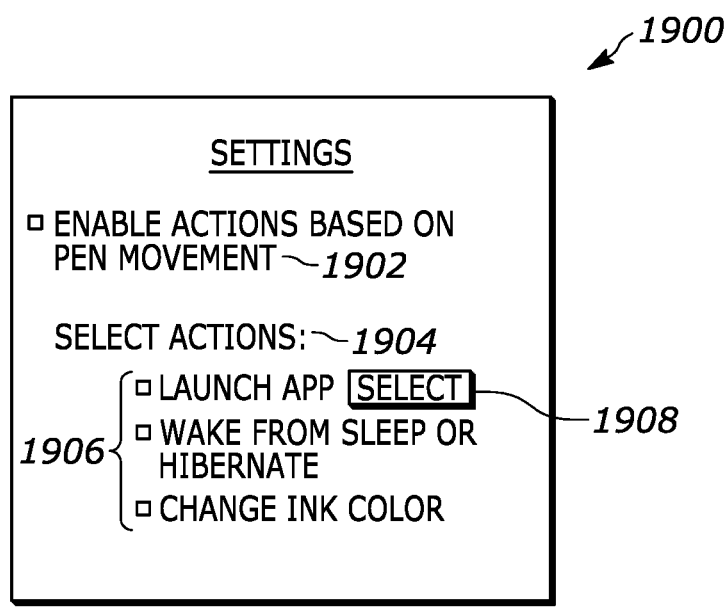
FIG. 19 shows an example GUI that may be presented on a display for configuring one or more settings of a device to operate consistent with present principles.

Moving on from FIG. 18 but before getting to FIG. 19, note that still other example actions may be taken at a device based on reports from a pen indicating motion or non-motion of the pen. For example, responsive to motion of the pen, a camera on the device may be activated and an associated camera application may be launched.

As another example, the device may execute voice recognition and, using input from a microphone in communication with the device, identify a user exclaiming "Send this to David" while the user circles or touches content presented on the device's display (such as a digital photograph or media file). The device may then access the user's contacts, automatically select David from the contacts, and without further user input send the circled or touched content (or associated file itself) to David via a preferred communication method (e.g., email or SMS).

Now describing FIG. 19, a GUI 1900 is shown that may be presented on the display of a device to configure one or more settings of the device to undertake present principles. Note that each of the options to be discussed below may be selected by directing touch or cursor input to the respectively adjacent check box for each option.

As shown in FIG. 19, the GUI 1900 may include a first option 1902 that may be selected to enable or set the device to, in the future, take various actions based on movement of a pen as reported by motion sensors in the pen. For example, selection of the option 1902 may set or configure the device to undertake the logic of FIG. 5 as well as to perform any of the actions described above in reference to FIGS. 7-18.

The GUI 1900 may also include a section 1904 at which one or more options 1906 may be selected that are associated with various particular actions the device may take. As shown, these options may include launching an application responsive to pen motion, waking the device from a sleep or hibernate state responsive to pen motion, and/or changing a color of ink to be presented on a display based on a twisting motion of the pen. Other actions as described herein may also be presented as options, and it is to be understood that only three options are shown in FIG. 19 for simplicity.

Further describing FIG. 19 and as far as the "launch app" option is concerned, note that as shown the option may be accompanied by a selector 1908. The selector 1908 may be selected to cause an applications list to be presented for the user to select one or more applications from the list. The selected applications may then be automatically launched or initiated in the future responsive to motion of the pen as described above in reference to FIG. 8.

It may now be appreciated that present principles provide for an improved computer-based user interface that improves the functionality and ease of use of the computing devices and electronic pens disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A device, comprising:
   at least one processor; and
   storage accessible to the at least one processor and comprising instructions executable by the at least one processor to:
   receive, from a stylus, at least one transmission indicating movement of the stylus; and
   take, based on the at least one transmission, at least one action at the device;
   wherein the instructions are executable to:
   responsive to the at least one transmission indicating movement of the stylus and then no movement of the stylus, one or more of: close a first application that uses input from the stylus to execute a function, revert to a previously-presented display screen.

2. The device of claim 1, wherein the at least one transmission is at least one first transmission, and wherein the instructions are executable to:
   launch at least the first application at the device based on at least one second transmission from the stylus.

3. The device of claim 2, wherein the first application is an application that uses input from the stylus to perform at least one function at the device, the first application being different from an operating system executable at the device.

4. The device of claim 1, comprising a touch-enabled display accessible to the at least one processor, wherein the at least one transmission is at least one first transmission, and wherein the instructions are executable to:
   determine, based on at least one second transmission from the stylus, that a portion of the stylus is being twisted; and
   based on the determination, change from presenting ink on the touch-enabled display based on future input from the stylus to erasing already-presented ink based on future input from the stylus.

5. The device of claim 1, wherein the at least one transmission is at least one first transmission, and wherein the instructions are executable to:
   based on at least one second transmission from the stylus, play or pause presentation of media at the device.

6. The device of claim 1, wherein the instructions are executable to:
   responsive to the at least one transmission indicating movement of the stylus and then no movement of the stylus for at least a threshold non-zero amount of time, one or more of: close the first application that uses input from the stylus to execute a function, revert to a previously-presented display screen.

7. The device of claim 6, wherein the threshold non-zero amount of time is configured by an end-user of the device.

8. The device of claim 1, wherein the instructions are executable to:
   responsive to the at least one transmission indicating movement of the stylus and then no movement of the stylus, present a prompt on a display, the prompt indicating that the first application is being closed based on no movement of the stylus.

9. The device of claim 8, wherein the instructions are executable to:
   responsive to the at least one transmission indicating movement of the stylus and then no movement of the stylus, present the prompt on the display, the prompt indicating via text that stylus motion is no longer being detected by the device and that the first application is being closed.

10. The device of claim 1, comprising the stylus.

11. The device of claim 10, wherein the stylus comprises one or more buttons that are respectively selectable to command the device to launch respective different particular applications that are associated with the respective buttons.

12. The device of claim 1, wherein the instructions are executable to:
    responsive to the at least one transmission indicating movement of the stylus and then no movement of the stylus, close the first application that uses input from the stylus to execute a function.

13. The device of claim 1, wherein the instructions are executable to:
    responsive to the at least one transmission indicating movement of the stylus and then no movement of the stylus, revert to a previously-presented display screen.

14. A method, comprising:
    receiving, at a device and from an electronic pen, at least one signal indicating movement of the electronic pen; and
    executing, based on the at least one signal, at least one function at the device;
    wherein the method comprises:
    determining, based on the at least one signal, that a portion of the electronic pen is being twisted; and based on the determination, changing from presenting ink on the display based on future input from the electronic pen to erasing already-presented ink based on future input from the electronic pen.

15. The method of claim 14, wherein the at least one signal is at least one first signal, and wherein the method comprises:

launching at least a first application at the device responsive to at least one second signal, the first application associated with processing input from the electronic pen.

16. The method of claim 14, wherein the at least one signal is at least one first signal, and wherein the method comprises:

responsive to at least one second signal indicating movement of the electronic pen and then no movement of the electronic pen, closing an application that uses input from the electronic pen to execute a function.

17. The method of claim 14, wherein the at least one signal is at least one first signal, and wherein the method comprises:

responsive to at least one second signal indicating movement of the electronic pen and then no movement of the electronic pen, reverting to a previously-presented display screen.

18. A method, comprising:

receiving, from a stylus, at least one transmission indicating movement of the stylus and then no movement of the stylus; and based on receiving the at least one transmission indicating movement of the stylus and then no movement of the stylus, taking one or more actions at a device, the one or more actions comprising one or more of: closing a first application that uses input from the stylus to execute a function, reverting to a previously-presented display screen.

19. The method of claim 18, comprising:

based on receiving the at least one transmission indicating movement of the stylus and then no movement of the stylus, closing the first application that uses input from the stylus to execute a function.

20. The method of claim 18, comprising:

based on receiving the at least one transmission indicating movement of the stylus and then no movement of the stylus, reverting to a previously-presented display screen.

* * * * *